July 4, 1944.   J. B. LENNES   2,352,793
COOLING AND VENTILATING SYSTEM FOR AIRPLANES
Filed June 25, 1940   2 Sheets-Sheet 1
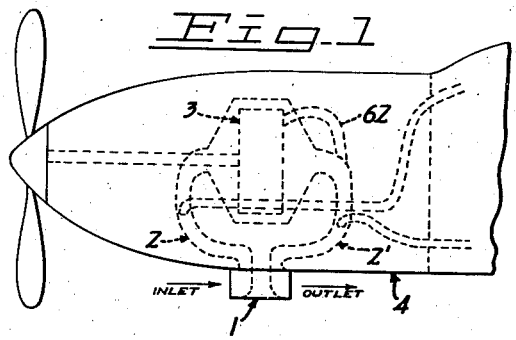
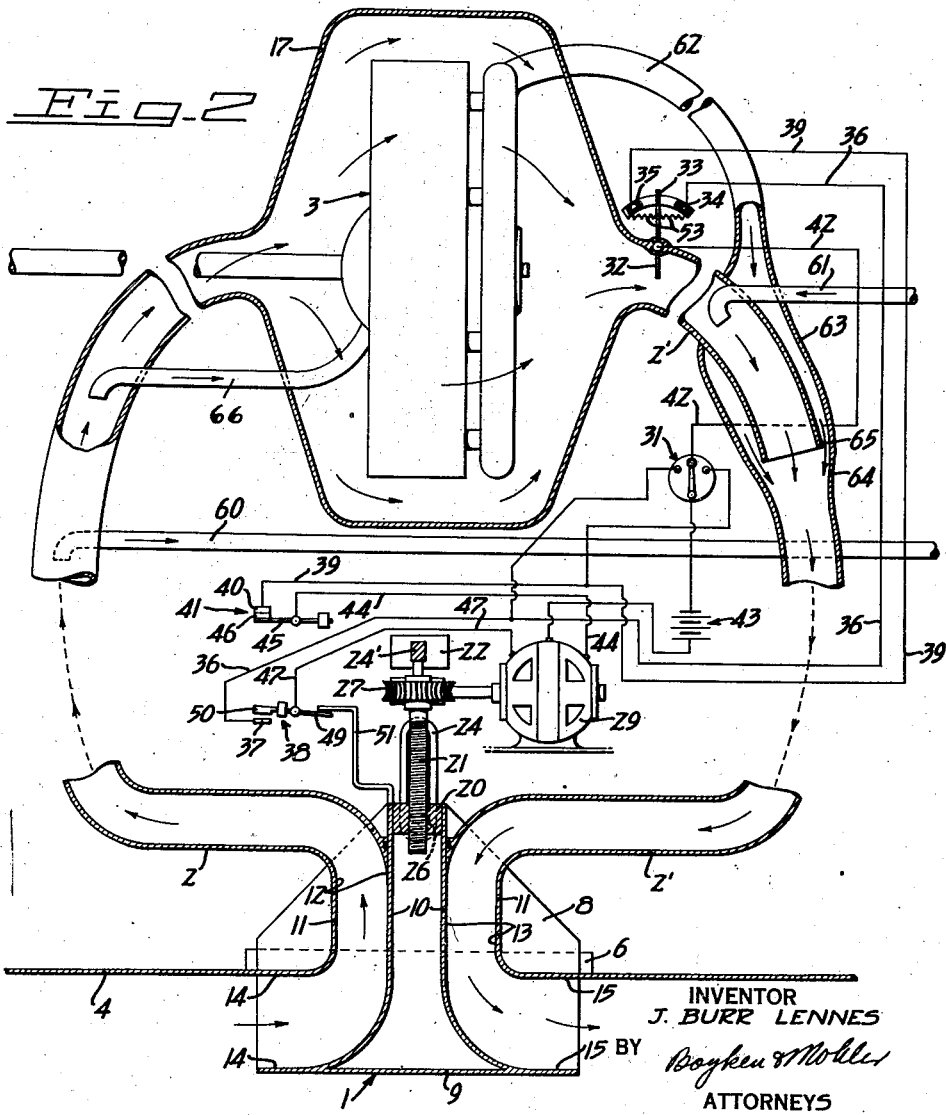
INVENTOR
J. BURR LENNES
BY
ATTORNEYS July 4, 1944. J. B. LENNES 2,352,793
COOLING AND VENTILATING SYSTEM FOR AIRPLANES
Filed June 25, 1940 2 Sheets-Sheet 2
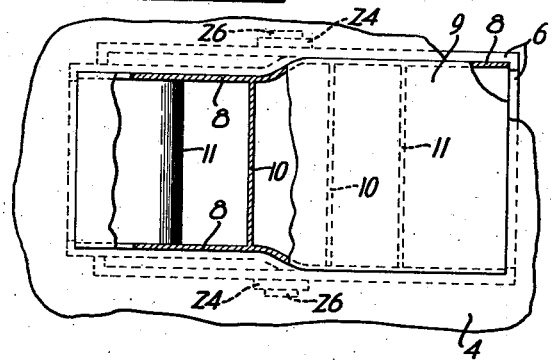
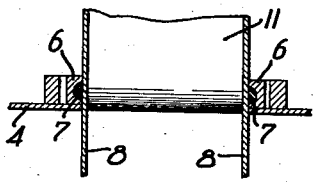
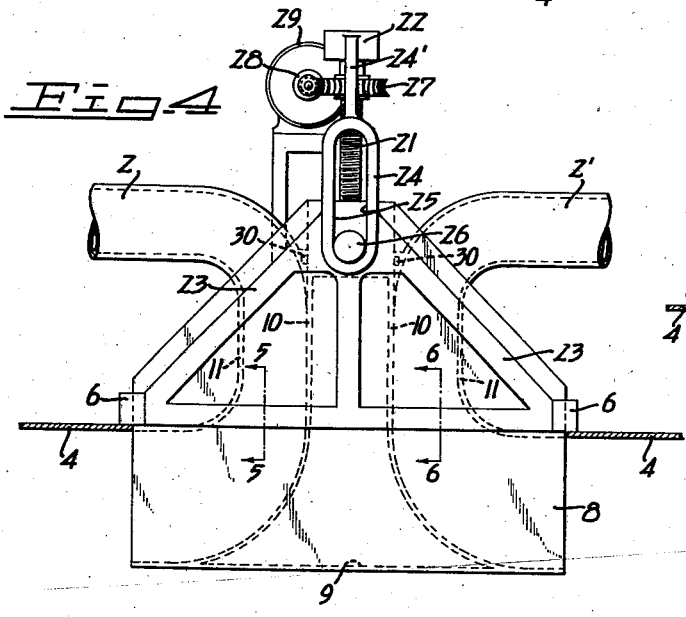
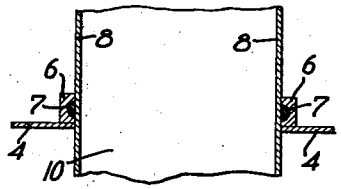
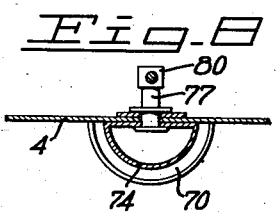
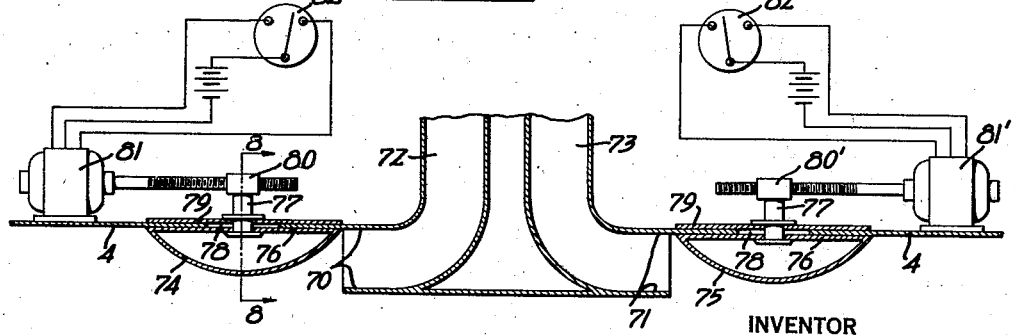
INVENTOR
J. BURR LENNES
BY
ATTORNEYS Patented July 4, 1944

2,352,793

UNITED STATES PATENT OFFICE 2,352,793

COOLING AND VENTILATING SYSTEM FOR AIRPLANES

J. Burr Lennes, San Francisco, Calif.

Application June 25, 1940, Serial No. 342,297

7 Claims. (Cl. 244—53)

This invention relates to an air circulating system for aircraft and has for one of its objects, improved means for bringing in air from outside an airplane for passing over the engine of the airplane and for discharging the air to the outside. Another object is an improved air "scoop" in an airplane having an air inlet and an air outlet with a passageway connecting between the inlet and outlet in which the airplane motor is disposed, and which scoop is adjustable to vary the sizes of the inlet and outlet for maintaining the most efficient volume of flow of air over the motor. A still further object is the provision of improved means for increasing the efficiency of the airplane motor and which means includes an air scoop for taking in air outside the airplane for passage over the motor and out again. Another object is an air scoop adapted to project from one of the surfaces of the airplane that is disposed generally parallel to the line of flight of the airplane, and which scoop is arranged to provide a relatively small area to the head wind for reducing the drag in the airplane. Other objects and advantages will appear in the description and drawings.

In the drawings, Fig. 1 is an elevational view of a portion of an airplane with my invention indicated in dotted line.

Fig. 2 is a semi-diagrammatic view illustrating my invention with respect to an airplane motor.

Fig. 3 is a part sectional, part plan view of my improved air scoop.

Fig. 4 is an elevational view of my improved air scoop, one side of the airplane being shown in section.

Figs. 5, 6 are fragmentary sectional views, respectively, taken along lines 5—5 and 6—6 of Fig. 4.

Fig. 7 is a sectional, semi-diagrammatic view of a modified form of the invention, and Fig. 8 is a sectional view taken along line 8—8 of Fig. 7.

In general, referring to Fig. 1, the air scoop device itself is generally indicated at 1, and which scoop has an air inlet facing in the normal direction of movement of the airplane. A conduit 2 extends from said inlet to the airplane motor 3, which is in an enlargement of the conduit, and a continuation 2' of said conduit extends from the motor to an outlet in said air scoop, which faces in direction opposite to that of the inlet, or in the trailing side.

In Figs. 2 to 6, the particular air scoop indicated in Fig. 1, is shown more in detail, it being understood, of course, that these drawings are illustrative of the invention and are not to be interpreted as being restrictive to the precise structure shown.

The air scoop itself is positioned in one of the outer walls 4 of the airplane, such as the fuselage, where the motor is in the body or fuselage, or in the wing or motor housing. Preferably, a substantially rectangular opening is formed in such wall, which opening, best indicated in Fig. 3, is elongated in the direction of the longitudinal axis of the airplane. Around this opening, and on the inner side of the wall is a frame 6 secured to said wall (Figs. 3, 4) the elongated sides of said frame being formed on their opposed sides with grooves in which are sealing strips 7 of material adapted to seal against the outer sides of a pair of opposed parallel plates 8 that are positioned to extend through said opening perpendicularly to the plane of the wall in which the opening is formed.

Between the outer edges of the plates 8 is an outer plate 9 that is parallel with the wall 4, which plate 9 is secured to said outer edges of the plates 8. The plates 8, as indicated in Figs. 2, 4, extend vertically through the lower wall of the fuselage, hence plate 9 is at the lower edges of said plates. Of course, the plates 8 may extend upwardly through the upper wall of the fuselage or through the upper wall of either wing, according to where the motor is positioned, but in the description, the term "above" or "below" as used with reference to the air scoop or to the elements thereof or elements associated therewith, relates to the position of the scoop as indicated in the drawings, and the term "forward" and "rear" or similar expressions, relate to positions relative to the front and rear end of the airplane.

Above plate 9 are a pair of strips 10 with their opposite lateral edges secured to plates 8, respectively. These strips 10 terminate at their lower end edges adjacent the forward and rear edges of plate 9 and from said edges they extend toward each other and toward the upper edges of plates 8, gradually curving until in parallel spaced relationship, in which parallel relationship they extend to the upper edges of plates 8.

The walls 4 extend to between plates 8, from the forward and rear edges of said plates and then curve to positions spaced from the adjacent strips 10 as indicated at 11, whereby the plates 8, strips 10 and the portions 11 define the walls of separate conduits 12, 13, the conduit 12 opening outwardly of the wall 4 in an inlet 14 facing in the direction of normal movement of the airplane and the conduit 13 being rearward of inlet 14 and facing toward the rear end of the airplane. Thus when the airplane is in flight, or when the propeller is revolving, the air will enter the inlet and will be forced into conduit 12, and out of the outlet 15.

Connecting with conduit 12, is conduit 2 that extends to the forward side of motor housing 17 within which the motor 3 is disposed and from the rear side of the housing 17 extends conduit 2' that communicates with the conduit 13. Thus the air taken in through inlet 14 will pass through conduits 12, 2 into housing 17 and over the motor, and after passing over the motor and cooling the latter, the air will then pass into conduits 2', 13 and out of outlet 15. Obviously, when the airplane is in flight, or when the propeller is revolving to create a rearwardly flowing air current over and past the air scoop, a rarified atmospheric pressure will exist at outlet 15, thereby facilitating the flow of air over the motor 3 and the exhausting of air from housing 17.

Heretofore in normal flight conditions, the volume of air passing over the engine within a given time may vary greatly, but for most efficient cooling, this volume should be controlled by means independently of the speed of the airplane. Where the speed of the airplane is increased, and where it is desirable that the maximum speed be attained, an appreciable "drag" or resistance is created by having the air scoop projecting outwardly at the same distance from the body as where lower speeds are maintained. Since a greater amount of air will be taken in by the scoop at higher speeds, and which amount is in excess of requirements for highest efficiency, I provide for drawing the air scoop out of the air stream to various degrees while maintaining the desired flow over the engine.

To accomplish the above withdrawal of the air scoop, a block 20 is disposed between the upper ends of strips 10, which block is centrally threaded for receiving a screw 21. Screw 21 is rotatably secured at its upper end in a bearing 22 secured to frame 6 by side frame members 23 extending alongside the outer sides of plates 8. The lower ends of the members 23 are adjacent the front and rear edges of plates 8 and extend convergently to the upper edges of the plates while the front and rear edges of said plates consequently converge from the frame 6. Adjacent the upper narrow edges of plates 8 the said members 23, that are at opposite outer sides of the plates 8, respectively, connect with a vertically slotted member 24 in the slots 25 of which extend pins 26 that project oppositely outwardly of opposite sides of plates 8 at their upper ends. The upper ends of members 24 connect with bearing 22 that supports screw 21, by extensions 24'.

Adjacent bearing 22 a gear 27 is secured on screw 21, which gear meshes with a worm gear 28 on the end of the armature shaft of a reversable motor 29, all as most clearly shown in Fig. 4.

Conduits 2, 2' respectively, are rectangular at their ends connecting with conduits 12, 13 so that the inner sides of plates 8 will slide over opposite sides of the said ends, and it is noted that these conduits 2, 2' terminate at their adjacent sides at said ends in sliding engagement with the plates 10, sealing strips 30 being provided to insure a tight sliding fit with plates 10 (Fig. 4).

In actual practice, the motor 29 may be controlled manually by a switch 31 (Fig. 2), although I also provide an automatic control actuated by the dynamic pressure of the air flowing in conduit 2'. This automatic control comprises a blade 32 extending partially into conduit 2', which blade is secured to one end of an arm 33, pivotally extending through a side of said conduit to the outside of the latter. The outer end of said arm carries a brush making electrical contact with one or the other of contacts 34, 35 on a segment of insulating material. Contact 34 may be connected by wire 36 with one fixed contact 37 of a switch, generally designated 38. Contact 35 is connected by wire 39 with one fixed contact 40 of a switch generally designated 41. The brush on arm 33 is connected by wire 42 through a contact and arm of switch 34 with one terminal of a battery 43 while the other terminal of the battery connects with motor 29. Wire 44 connects between motor 29 and pivoted switch arm 45 carrying a gravity actuated contact 46 adapted to normally make contact with contact 40 unless the arm is pivoted by external force.

The remaining wire 47 connects between motor 29 and pivoted arm 49 similar to arm 45, which latter arm carries a contact 50 normally gravity actuated to remain in engagement with contact 37. The upper end of strips 10 carry an arm 51 having a lip 52 that will engage either arm 45 or arm 49 of switches 38, 41 when the air scoop has either been moved in or out of the wall 4 to either end of the stroke. The arm 33 is maintained in neutral position between contacts 34, 35 by springs 53.

In the drawings, the air scoop is projected to its fullest extent outwardly of the wall 4 and contacts 37, 50 are broken, hence the motor 29 will remain inoperative until an increase in velocity of air against blade 32 results in the brush on arm 33 engaging contact 35 when the motor will be actuated to cause the air scoop to be drawn into the fuselage a distance. As soon as the velocity of air decreases to the desired degree, the brush will pass from contact 35 and the motor will stop. The switches 38, 41 are merely safety devices, and, of course, any desired conventional systems of relays or switches may be used, the system illustrated being shown in a single form for clarity, since no claim is made to the control in itself apart from the system in which it is used.

In some instances it is desirable to extend a pipe 60 from the airplane cabin into conduit 2 for supplying fresh air to the cabin, and also a pipe 61 may extend into conduit 2' for withdrawing stale air from said cabin. Also, I have found it highly desirable in some instances to connect the exhaust pipe 62 from the motor 3 in the conduit 2'. This exhaust is preferably an enlarged chamber 63 around conduit 2' (Fig. 2) at a point in the length of the latter. The chamber 63 contracts at its end nearest outlet 15, as at 64, and continues as conduit 2', the latter being broken inside chamber 63 to form an annular aperture 65 through which the exhaust gases pass in direction toward outlet 15 causing an appreciable suction at the termination in chamber 63 of that portion of conduit 2' that extends from housing 17. This arrangement results in an aspirating action on the air in housing 17 thus facilitating the withdrawal of air from chamber 17 and the movement of air over the motor 3. The exhaust gases from the airplane motor are cooled by the air in conduit 2', thus contracting the gases and reducing the back pressure thereby increasing the efficiency of the motor. Also, of course, the suction at the outlet 15 also tends to reduce back pressure in the engine exhaust.

In Fig. 3 it is to be noted that the plates 8 diverge at a point between strips 10, so that the outlet 15 in the air scoop is of appreciably greater size than the inlet, and the conduits 10, 2', are proportionally increased to provide for the expansion of the air passing through housing 17, as well as expansion resulting from heat from the exhaust gases from exhaust 62, when the latter connects into conduit 2'.

In some instances the exhaust 62 may discharge the exhaust gases in the usual way without entering conduit 2', and the pipes 60, 61 leading to the cabin may be omitted.

In Figs. 7, 8 the modified form of the invention shows the air scoop rigidly supported in position projecting from the outer surface of one of the walls 4 of the airplane, which air scoop, has a generally hemispherical inlet 70 facing in the direction of normal movement of the airplane and similarly shaped outlet 71 facing in the opposite direction with conduit 72 adapted to lead to one side of the housing of the airplane motor with the conduit 73 leading from the outlet to the other side of the motor. In advance of the inlet is a variable valve element 74 comprising a generally dome-shaped element elongated in direction axially of the inlet and outlet with its flat side slidably fitted against the wall 4 of the airplane. The general outer contour of the said element 74 resembles a football bisected on its longitudinal axis. A similar valve element 75 is rearwardly of outlet 71 and in the same relation to said outlet as the element 74 is to inlet 70. Thus, element 74, the inlet 70, outlet 71 and element 75 are in alignment.

To the flat side 76 of each element 74, 75 is secured a bar 77 extending through a slot 78 extending in direction of the longitudinal axes of the valve elements and a plate 79 inside wall 4 is secured to each bar 77 covering said slot. The inner end of each bar 77 carries a nut. The nut thus connected with element 74 is designated 80 and the nut connected with element 75 is designated 80'.

A reversible motor 81 carries a screw on its drive shaft extending its threaded engagement through nut 80 and a similar motor 81' carries a screw similarly extending through nut 80'. Each motor 81, 81' is separately controlled through switches 82, 82' respectively.

In operation, upon actuating motor 81 for rotation in one direction the element 74 will be moved toward inlet 70 and partially into the latter, progressively restricting the inlet, while upon actuation of said motor 81 for rotating in the opposite direction the reverse will occur. Actuation of motor 81' for rotation in one direction or the other will correspondingly restrict or enlarge outlet 71.

It is important to note with this form of the invention the valve elements are arranged with respect to the air scoop to stream-line the air scoop, and also the inlet and outlet are controlled separately. The air scoop itself carries both inlet and outlet, and, of course, the conduits 72, 73 may connect with elements as already described relative to the other views. It is, of course, manifest that any suitable means may be employed for actuating the valve elements 74, 75, the means shown in the drawings being merely illustrative of one means.

In either form of the invention, means is provided for varying the velocity of the air which cools the airplane engine with the minimum of resistance or drag.

Also, the exhaust gases may facilitate the circulation of the air for cooling, over the engine, or the air admitted by the air scoop may facilitate the movement of the exhaust gases from the engine, according to which has the greater velocity.

In Fig. 2 the switch 31 provides for manual actuation of the motor 29, as desired, and in either of the forms of invention disclosed, that is in Figs. 2 or 7, it is obvious that the invention is not necessarily restricted to use with air-cooled engines, since water-cooled engines or the radiators for the latter, or both, may be positioned to be in the path of air caused to flow through conduits 2, 2' or 72, 73.

In most instances, I also prefer to place an air intake conduit 66 in conduit 2 with its open end facing opposite to the direction of flow of air in said conduit for supplying air to the carburator for air for combustion.

This positioning of the air intake between the engine and inlet to the air scoop, as shown, is highly desirable and is particularly advantageous for stabilizing engine performance where the exhaust is between the engine and the outlet.

Having described my invention, I claim:

1. In an airplane having its engine disposed therein; a conduit for air enlarged at a point between its opposite ends and enclosing said engine in said enlargement thereof; an air inlet and an air outlet at said opposite ends disposed in the air stream flowing over the outer side of said airplane; said inlet and said outlet being directed away from each other positioned one behind the other in a common plane parallel with the direction of normal air flow; air control means for regulating the volume of air passing through said inlet and outlet respectively; said air control means and said inlet and outlet being movable relatively to positions varying the capacity of said inlet and outlet respectively, directly thereat to passage of air therethrough.

2. In an airplane having its engine disposed therein; a conduit for air enlarged at a point between its opposite ends and enclosing said engine in said enlargement thereof; an air inlet and an air outlet at said opposite ends disposed outwardly of one of the outer walls of said airplane; said inlet and said outlet respectively, being directed away from each other; air control means for regulating the volume of air passing through said inlet and outlet respectively; said air control means and said inlet and outlet being movable simultaneously relatively to positions reducing or increasing in direct proportion, the capacity of said inlet and outlet respectively, to pass air therethrough and air pressure responsive means within said conduit responsive for movement to the dynamic pressure of air passing through said conduit associated with said control means for causing said relative movement of said control means and said inlet and outlet to said positions.

3. In an airplane having its engine disposed therein; and open-ended conduit for air arranged and adapted to be positioned within said airplane enclosing said engine at a point between said open ends; the openings at the ends of said conduit being directed oppositely outwardly of each other for facing generally toward and away from the forward end of such airplane and being disposed in the air stream passing over the outer sides of said airplane; the end portions of said conduit in said air stream defining the outlines of the openings therein being secured together for movement as a unit transversely of the directions in which said openings face, and means for so supporting said end portions for said movement and for so moving the latter.

4. In an airplane having its engine disposed within the fuselage; a main opening formed in one outside wall of said fuselage between the opposite ends; an air scoop comprising a partition extending transversely through said opening and across the latter dividing said opening into a pair of openings respectively disposed at opposite sides of said partition with said openings disposed in line in the same plane parallel with the longitudinal axis of the fuselage; said partition projecting outwardly of said outside wall and into the air stream passing thereover for deflecting air into the opening of said pair nearest the forward end of the fuselage; a conduit enclosing said engine communicating at its ends with the openings of said pair for passing the air so deflected through said conduit to the opening of said pair nearest the rear end of said fuselage; a plate secured to said partition spaced outwardly of said outer wall and extending over the openings of said pair; means supporting said partition and plate for movement as a unit toward and away from said axis to thereby increase or reduce the spacing between said plate and the openings of said pair; and means for so moving said partition and plate.

5. In a construction as defined in claim 3, a pair of spaced opposed side walls disposed in planes parallel with said axis and extending from said plate through the said main opening into said airplane; said side walls being secured to said plate for movement therewith.

6. In an airplane having outside walls generally parallel with the normal direction of air flow, and having an engine therein; an opening formed in one of said walls extending transversely relative to said direction of air flow, an air scoop extending through said opening, said air scoop including a pair of conduits extending through said opening in side by side relation and in a common plane that is substantially parallel with said direction of air flow thereby providing a forward and a rear conduit relative to the rear and forward ends of the airplane respectively, said conduits terminating at one of their ends outside the wall having said opening and terminating at their inner ends within said airplane at opposite sides of said engine, the forward conduit of said pair having a forwardly directed inlet at its end that is outside said wall and the rear conduit having a rearwardly directed air outlet at its end that is outside said wall, said inner ends of said conduits being open, a single plate connecting the ends of the conduit that are outside said wall, and means for varying the effective areas of said inlet and said outlet for receiving and discharging air.

7. In an airplane having outside walls generally parallel with the normal direction of air flow, and having an engine therein; an opening formed in one of said walls extending transversely relative to said direction of air flow, an air scoop extending through said opening, said air scoop including a pair of conduits extending through said opening in side by side relation and in a common plane that is substantially parallel with said direction of air flow thereby providing a forward and a rear conduit relative to the rear and forward ends of the airplane respectively, said conduits terminating at one of their ends outside the wall having said opening and terminating at their inner ends within said airplane at opposite sides of said engine, the forward conduit of said pair having a forwardly directed inlet at its end that is outside said wall and the rear conduit having a rearwardly directed air outlet at its end that is outside said wall, said inner ends of said conduits being open, a single plate connecting the ends of the conduit that are outside said wall, and means for varying the effective areas of said inlet and said outlet for receiving and discharging air, said means comprising valve elements outside the wall having said opening and through which said air scoop extends, said elements being in alignment with said inlet and said outlet respectively and slidably supported on said wall for movement toward and away from said inlet and said outlet respectively to progressively open and close said inlet and said outlet to flow of air into and out of the same, and means for causing said movement.

J. BURR LENNES.